US009569974B2

(12) United States Patent
Albert et al.

(10) Patent No.: US 9,569,974 B2
(45) Date of Patent: Feb. 14, 2017

(54) METHOD AND ASSEMBLY FOR GUIDANCE OF AN AIRCRAFT DURING A LOW-ALTITUDE FLIGHT

(71) Applicant: Airbus Operations (S.A.S.), Toulouse (FR)

(72) Inventors: Nicolas Albert, La Salvetat Saint Gilles (FR); Thomas Koebel, Toulouse (FR); Boris Kozlow, Toulouse (FR); Remy Laugero, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 1 day.

(21) Appl. No.: 14/694,690

(22) Filed: Apr. 23, 2015

(65) Prior Publication Data
US 2015/0310746 A1    Oct. 29, 2015

(30) Foreign Application Priority Data

Apr. 28, 2014    (FR) ...................................... 14 53805

(51) Int. Cl.
*G05B 9/00* (2006.01)
*G08G 5/00* (2006.01)
(Continued)

(52) U.S. Cl.
CPC ............. *G08G 5/0047* (2013.01); *G01C 21/00* (2013.01); *G01C 21/20* (2013.01); *G05D 1/0646* (2013.01);
(Continued)

(58) Field of Classification Search
USPC .... 701/3, 14, 16, 4, 11, 18, 23, 25, 26, 301; 340/976
See application file for complete search history.

(56) References Cited

U.S. PATENT DOCUMENTS 4,907,485 A * 3/1990 Westphal ................ F42B 12/62
102/476
7,089,091 B2 * 8/2006 Artini ..................... G01C 23/00
701/14
(Continued)

FOREIGN PATENT DOCUMENTS

EP    1 598 641    11/2005
EP    1 598 721    11/2005
(Continued)

OTHER PUBLICATIONS

French Search Report and Written Opinion for Application No. 14 53 805 dated Jan. 22, 2015.

*Primary Examiner* — Thomas Tarcza
*Assistant Examiner* — Richard Goldman
(74) *Attorney, Agent, or Firm* — Jenkins, Wilson, Taylor & Hunt, P.A.

(57) ABSTRACT

A method and assembly for guidance of an aircraft during a low-altitude flight. The guidance assembly comprises a memory forming part of a flight management system, which is configured to store an active flight trajectory and any new flight trajectory, generated by the flight management system, and a memory forming part of a guidance system, which is configured to also store the flight trajectory and any new flight trajectory, which are received from the flight management system, the guidance assembly being configured to periodically transmit from the guidance system to the flight management system identification codes for the flight trajectories recorded in the memory of the guidance system.

10 Claims, 4 Drawing Sheets

(51) Int. Cl.
  *G01C 21/00*   (2006.01)
  *G01C 21/20*   (2006.01)
  *G05D 1/06*    (2006.01)
  *G05B 9/03*    (2006.01)

(52) U.S. Cl.
  CPC .......... *G08G 5/0021* (2013.01); *G08G 5/0039* (2013.01); *G05B 9/03* (2013.01); *G08G 5/0086* (2013.01)

(56) References Cited

U.S. PATENT DOCUMENTS

| | | | | |
|---|---|---|---|---|
| 7,400,951 | B2 * | 7/2008 | Artini | G05D 1/0646 340/967 |
| 7,899,613 | B2 * | 3/2011 | Artini | G05D 1/0646 340/963 |
| 8,027,783 | B2 * | 9/2011 | Closse | G05D 1/101 340/976 |
| 8,660,715 | B2 * | 2/2014 | Nicolas | G05D 1/0077 701/3 |
| 2005/0261812 | A1 * | 11/2005 | Artini | G01C 23/005 701/16 |
| 2005/0273221 | A1 * | 12/2005 | Artini | G01C 23/00 701/3 |
| 2005/0273248 | A1 * | 12/2005 | Artini | G05D 1/0646 701/120 |
| 2005/0273249 | A1 * | 12/2005 | Artini | G05D 1/0646 701/120 |
| 2006/0102797 | A1 * | 5/2006 | Artini | G05D 1/105 244/178 |
| 2008/0208400 | A1 * | 8/2008 | Bouchet | G01C 23/00 701/4 |
| 2009/0105943 | A1 * | 4/2009 | Ferro | G01C 23/005 701/533 |
| 2009/0177400 | A1 * | 7/2009 | Silly | G05D 1/0646 701/301 |
| 2010/0017113 | A1 * | 1/2010 | Artini | G05D 1/0646 701/3 |
| 2015/0310746 | A1 * | 10/2015 | Albert | G08G 5/0047 701/3 |
| 2016/0078769 | A1 * | 3/2016 | Coulmeau | G01C 21/20 701/537 |

FOREIGN PATENT DOCUMENTS

| | | |
|---|---|---|
| EP | 1 598 722 | 11/2005 |
| FR | 2 908 219 | 5/2005 |
| FR | 2 922 642 | 4/2009 |
| FR | 2 970 093 | 7/2012 |

* cited by examiner

METHOD AND ASSEMBLY FOR GUIDANCE OF AN AIRCRAFT DURING A LOW-ALTITUDE FLIGHT

CROSS-REFERENCE TO RELATED APPLICATION

This application claims the benefit of and priority to French patent application No. 14 53805 filed on Apr. 28, 2014, the entire disclosure of which is incorporated by reference herein.

BACKGROUND

The present disclosure relates to a method and an assembly for guidance of an aircraft during a low-altitude flight.

In a standard manner, a low-altitude flight phase, called LLF ("Low Level Flight") phase, allows an aircraft to fly at low altitude, in particular so as to follow as closely as possible the terrain overflown, especially so as to avoid being pinpointed, while removing any risk of collision with a part of the terrain. Such an LLF phase generally takes place at a predetermined terrain altitude, for example at 500 feet (about 150 meters).

In particular, for a military aircraft, especially a military transport airplane, one of the objectives of a low-altitude flight is to exploit the masking in relation to the terrain to protect oneself from threats in hostile geographical zones. Accordingly, in particular in order to carry out in-flight instrument based operations of IMC ("Instrument Meteorological Conditions") type, a flight management system of FMS ("Flight Management System") type computes in a standard manner a three-dimensional reference trajectory (taking into account the terrain overflown), and the aircraft is guided along this reference trajectory (either automatically with the aid of an automatic piloting system, or manually by following indications presented by a flight director).

The aircraft's flight management system is therefore responsible for the computation of the reference trajectory. This reference trajectory is computed using data relating to the terrain overflown and the aircraft's climb and descent capabilities, as well as its maneuvering capabilities.

Furthermore, the aircraft comprises a guidance system comprising at least one guidance computer, of FGC ("Flight Guidance Computer") type, which is responsible for slaving the aircraft to this reference trajectory.

A flight of IMC LLF type being subject to safety rules, the flight management and guidance systems must, inter alia, ensure that a minimum trajectory distance (called the MEMO distance) is available and validated ahead of the aircraft during guidance (or before guidance, so as to authorize guidance). Consequently, the flight trajectory that the aircraft has to follow must be transmitted in advance by the flight management system. The guidance system makes sure of the storage and validation of this trajectory.

Furthermore, a trajectory constructed by the flight management system, and such as defined in a flight plan, may be revised or canceled. In the case of such a revision before the flight of an LLF phase, the former trajectory is removed from the flight management system. It is in particular necessary that the guidance system not slave the aircraft to a trajectory (previously received and stored) that is unknown to the flight management system.

Furthermore, the architecture and the operation of these two systems (flight management system and guidance system) must ensure that the aircraft can only be guided on a valid trajectory (meeting the safety criteria) that the pilot knows (via the flight management system) and desires be flown, and that the low-altitude flight capability is not lost upon a change of trajectory.

SUMMARY

An object of the present disclosure is to meet these needs. It relates to a method of guidance of an aircraft during a low-altitude flight, the object of which is in particular to allow the aircraft to retain the low-altitude flight capability, especially during a modification of the flight trajectory.

According to the disclosure herein, the method comprises:
a) constructing with the aid of a flight management system a low-altitude flight trajectory corresponding to a flight plan, the flight trajectory being transmitted from the flight management system to a guidance system, the flight management system being able to construct at least one new low-altitude flight trajectory corresponding to a new flight plan; and
b) guiding the aircraft with the aid of the guidance system, along the low-altitude flight trajectory termed the active flight trajectory,
and is noteworthy by comprising additional steps of:
storing in at least one first memory of the flight management system, the active flight trajectory along which the aircraft is guided, as well as any new flight trajectory;
storing in at least one second memory of the guidance system, the active flight trajectory along which the aircraft is guided, as well as any new flight trajectory;
identifying, with the aid of an associated identification code, each flight trajectory transmitted from the flight management system to the guidance system; and
periodically transmitting from the guidance system to the flight management system, the identification codes for the flight trajectories recorded in the second memory of the guidance system.

Thus, by virtue of the disclosure herein, during a low-altitude flight of the aircraft (in particular of IMC LLF type), the flight management system and the guidance system store the trajectories used, and in particular the current flight trajectory, so as to be able to return on the latter upon failure of activation of a new flight trajectory, and thus to avoid losing the low-altitude flight capability upon a change of trajectory.

Furthermore, the two systems (the flight management system and the guidance system) periodically synchronize with one another, via the transmission of identification codes for the recorded flight trajectories. This makes it possible in particular to ensure that the aircraft can only be guided on a valid trajectory (meeting security criteria) that the pilot knows (via the flight management system) and desires be flown, as specified hereinbelow.

Advantageously, the guidance method comprises a step of exchanging activation information between the flight management system and the guidance system, the activation information indicating at least the active flight trajectory along which the aircraft is guided.

Furthermore, in an advantageous manner, the guidance method comprises, moreover, steps comprising or consisting of, for any new flight trajectory:
implementing in the guidance system, a verification consisting in verifying whether or not the new flight trajectory is valid; and
transmitting from the guidance system to the flight management system a validity status relating to the new flight trajectory, this validity status indicating whether or not the new flight trajectory is valid.

Furthermore, advantageously, the guidance method comprises, moreover, steps comprising or consisting of:

implementing in the flight management system, a verification consisting in verifying whether the following two conditions are fulfilled for a new flight trajectory:
this new flight trajectory is considered to be valid by the guidance system; and
this new flight trajectory corresponds to a flight plan approved by a pilot of the aircraft; and for the flight management system, in authorizing the guidance by the guidance system of the aircraft along this new flight trajectory, if the two conditions are fulfilled simultaneously.

Furthermore, in a particular embodiment, the guidance method comprises:

an additional step comprising or consisting of, during the activation of a new flight trajectory (comprising or consisting in rendering this new flight trajectory active, that is to say in guiding the aircraft along the latter), erasing the previously active flight trajectory in the first and second memories and/or the previous flight plan in the first memory; and/or an additional step comprising or consisting of, in case of failure of an activation of a new flight trajectory, reactivating at the level of the flight management system the previous flight plan and the associated (or corresponding) flight trajectory.

The present disclosure also relates to a guidance assembly for guiding an aircraft at least during a low-altitude flight.

According to the disclosure herein, the guidance assembly of the type comprises:

a flight management system configured to construct a low-altitude flight trajectory corresponding to a flight plan, the flight management system being able to construct at least one new low-altitude flight trajectory corresponding to a new flight plan;

a data transmission unit configured to transmit the flight trajectory from the flight management system to a guidance system; and the guidance system which is configured to guide the aircraft along the low-altitude flight trajectory, termed the active flight trajectory, and is noteworthy in that:

the guidance assembly comprises moreover:
at least one first memory forming part of the flight management system, the first memory being configured to store the active flight trajectory along which the aircraft is guided and any new flight trajectory; and
at least one second memory forming part of the guidance system, the second memory being configured to store the active flight trajectory along which the aircraft is guided and any new flight trajectory, received from the flight management system; and the guidance assembly is configured to periodically transmit from the guidance system to the flight management system identification codes for the flight trajectories recorded in the second memory of the guidance system, each flight trajectory transmitted from the flight management system to the guidance system being identified with the aid of an associated identification code.

Furthermore, advantageously, the guidance assembly is configured to implement an operation comprising or consisting of, during the activation of a new flight trajectory, erasing the previously active flight trajectory, in the first and second memories.

Moreover, in a particular embodiment, the flight management system is configured to implement an operation comprising or consisting of, in case of failure of an activation of a new flight trajectory, reactivating the current flight plan and the corresponding (or associated) flight trajectory.

The present disclosure relates moreover to an aircraft, especially a transport airplane, in particular military, which is provided with a guidance assembly such as that specified hereinabove.

BRIEF DESCRIPTION OF THE DRAWINGS

The figures of the appended drawing will elucidate the manner in which the disclosure herein may be embodied. In these figures, identical references designate similar elements.

DETAILED DESCRIPTION

Figure 1:
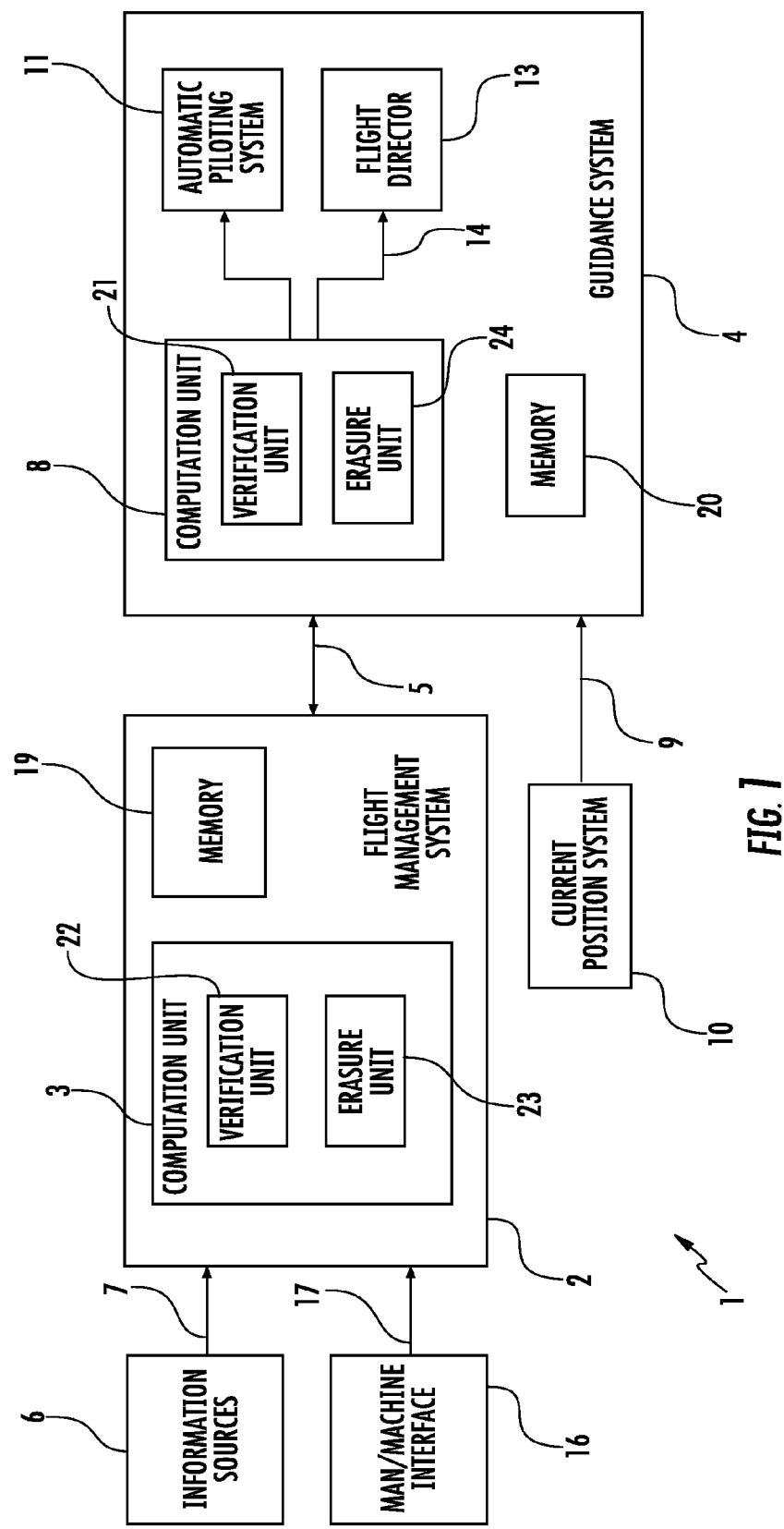
FIG. 1 is the schematic diagram of a guidance assembly which illustrates an embodiment of the disclosure herein.

The guidance assembly 1 represented schematically in FIG. 1 and making it possible to illustrate the disclosure herein, is intended to automatically guide an aircraft AC (FIGS. 2 to 5), especially a military transport airplane, at least during a low-altitude flight (in particular of IMC LLF type), along a low-altitude flight trajectory.

Accordingly, this guidance assembly 1 which is onboard the aircraft AC, comprises:

a flight management system 2 of FMS ("Flight Management System") type, which comprises a standard computation unit (or central unit) 3 for constructing a low-altitude flight trajectory corresponding to a flight plan. The flight management system 2 is able to construct a new flight trajectory corresponding to a new flight plan;

a guidance system 4 configured to guide the aircraft AC along a low-altitude flight trajectory termed the active flight trajectory; and a data transmission unit (dual link 5) configured to transmit information between the flight management system 2 and the guidance system 4.

The low-altitude flight trajectory is constructed, in a standard manner, by the computation unit 3 as a function of the relief of the terrain overflown and of a safety corridor which defines limits on either side of the flight trajectory at least in the lateral (or horizontal) plane.

The guidance assembly 1 comprises, moreover, a man/machine interface 16 allowing a crew member (via a link 17) to enter data, and in particular a flight plan, into the flight management system 2 and to modify a flight plan.

In a particular embodiment, the guidance assembly 1 also comprises an assembly 6 of standard information sources, which is connected by way of a link 7 to the flight management system 2 and which provides information to the flight management system 2, in particular the current values of flight parameters of the aircraft AC, as well as terrain information.

Moreover, the guidance system 4 comprises a computation unit (or central unit) 8 which corresponds, preferably, to a guidance computer of FGC ("Flight Guidance Computer") type. This computation unit 8 is formed so as to compute guidance settings, as a function of the (in particular low-altitude) flight trajectory received from the flight management system 2 via the link 5 and of a current position indication, received via a link 9 of a system 10 for determining the current position of the aircraft AC. This system 10 of standard type can comprise, in particular, a position computer which calculates the current position of the aircraft on the basis of information received from position sensors, and especially of information received from GPS receivers and/or one or more units for generating air and inertial data.

The guidance system 4 comprises, in addition to the computation unit 8:
a standard automatic piloting system 11 which is able to pilot the aircraft AC automatically, as a function of guidance orders received from the computation unit 8 via a link 12; and/or
a flight director 13 which presents piloting indications to the pilot on a dedicated screen, as a function of guidance orders received from the computation unit 8 via a link 14.

According to the disclosure herein, the guidance assembly 1 comprises moreover:
at least one memory 19 forming part of the flight management system 2 and for example of the computation unit 3. This memory 19 is configured to store at least the active flight trajectory along which the aircraft AC is guided and any new flight trajectory determined by the computation unit 3; and
at least one memory 20 forming part of the guidance system 4 and for example of the computation unit 8. This memory 20 is configured to store at least the flight trajectory along which the aircraft AC is guided and any new flight trajectory, received from the flight management system 2 via the link 5.

Moreover, according to the disclosure herein, each flight trajectory transmitted from the flight management system 2 to the guidance system 3 is identified with the aid of an associated identification code (or name or number), for example TRAJi or Ti for a trajectory of index "i".

Furthermore, according to the disclosure herein, the guidance assembly 1 is configured to transmit periodically (for example every 120 ms), from the guidance system 4 to the flight management system 2, the identification codes for the flight trajectories recorded in the memory 20 of the guidance system 4.

Consequently:
the flight management system 2 is thus capable of storing (in the memory 19) a new LLF trajectory defined in the active flight plan (the trajectory that the pilot desires to fly), as well as the active LLF trajectory (according to which the aircraft AC is currently guided by the guidance system 4); and
the guidance system 4 is capable of storing (in the memory 20) the new revised or defined LLF trajectory of the active flight plan (termed the passive trajectory in the course of validation or of activation) and the trajectory validated for guidance (termed the active trajectory).

The guidance assembly 1 provides for exchanges of activation information between the flight management system 2 and the guidance system 4. This activation information indicates at least the active flight trajectory along which the aircraft AC is guided. In particular, as indicated hereinabove, the guidance system 4 informs, periodically, the flight management system 2 of the stored flight trajectories by transmitting the trajectory numbers (or identification codes).

The flight management system 2 and the guidance system 4 thus synchronize with one another, incessantly, thereby making it possible to ensure that the aircraft AC can only be guided on a valid flight trajectory (meeting the safety criteria) that the pilot knows (via the flight management system 2) and which he desires be followed by the aircraft AC.

During a flight of an LLF phase, the flight trajectory T1 (FIG. 2) defined in the flight plan can be revised (for example so as to avoid a hostile zone). The process leading to the slaving of the guidance system 4 to the revised trajectory T2 lasts several seconds (typically 30 seconds), during which it is necessary to maintain the LLF flight conditions.

Figure 2:
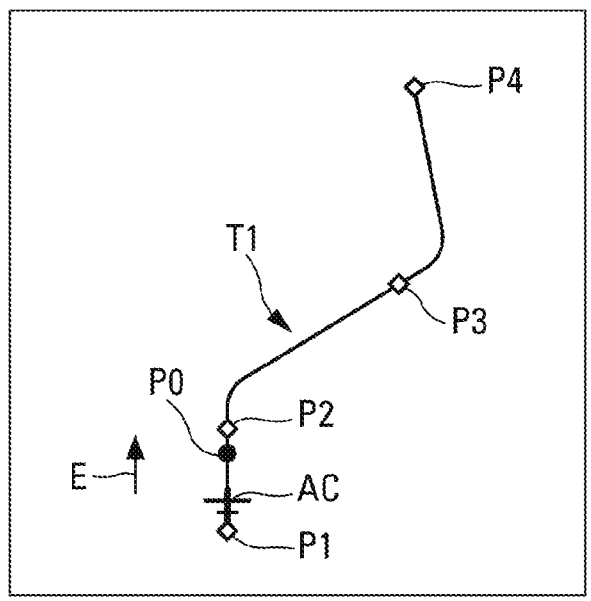
FIGS. 2 to 4 show various successive steps during the activation of a new low-altitude flight trajectory.
Figure 3:
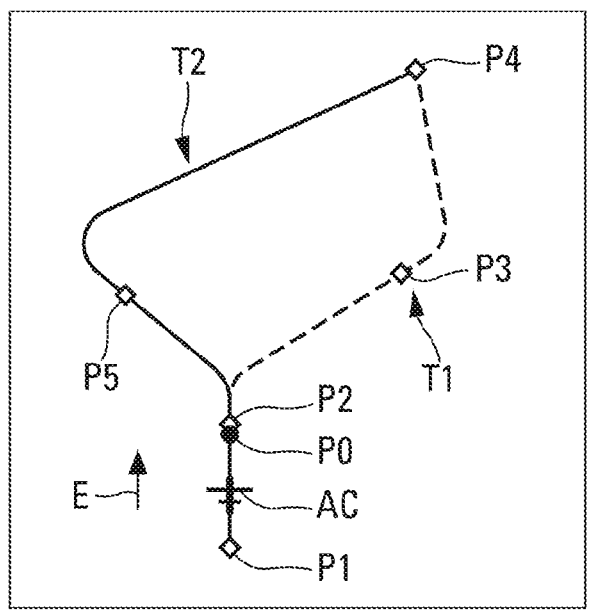

In the example of FIG. 2, the current trajectory T1 followed by the aircraft AC passes through successive waypoints P1, P2, P3 and P4 forming part of the initial flight plan. Furthermore, in this example, as represented in FIG. 3, the new flight trajectory (or auxiliary trajectory) T2 deviates from the flight trajectory T1 downstream of the waypoint P2 (in the flight direction E) to rejoin a waypoint P4 via a new waypoint P5 (for example entered by the pilot with the aid of an input unit of the man/machine interface 16), instead of passing through the waypoint P3. In FIGS. 2 to 5 is also represented a point P0 downstream of the current position of the aircraft AC at which a revision triggered at the current instant will be effective as soon as possible.

The new trajectory T2 may be judged unflyable at any moment of the revision process, thus requiring that the two systems 2 and 4 be re-slaved to the (current) initial trajectory T1. For this purpose, the current trajectory T1 is retained by the flight management system 2 and by the guidance system 4, at least until the slaving of the guidance system 4 to the new trajectory T2.

For these reasons, during the LLF flight, the flight management system 2 and the guidance system 4 store the current trajectory T1 so as to be able to return to the latter in case of failure of activation on the new trajectory T2 of LLF type, and thus to avoid losing the LLF flight capability.

Furthermore, the guidance system 3 comprises a verification unit 21 (which may for example form part of the computation unit 8). This verification unit 21 implements, for any new flight trajectory T2, a verification comprising verifying the validity of this new flight trajectory T2, in particular so as to verify that there has been no error or fault during the transmission of the flight trajectory T2. In a preferred embodiment, the flight management system 2 comprises two flight management computers which each dispatch the same trajectory, and the verification unit 21 verifies whether the two trajectories received are identical to declare them valid. A validity status of the new flight trajectory T2 (indicating whether the latter is valid or invalid) is thereafter transmitted from the guidance system 4 to the flight management system 2 (via the link 5).

Furthermore, the flight management system 2 comprises a verification unit 22 (which may for example form part of the computation unit 3). This verification unit 22 implements a verification comprising or consisting of verifying whether the following two conditions are fulfilled simultaneously, for any new flight trajectory T2:
the flight trajectory T2 is considered to be valid by the guidance system 3; and
the flight trajectory T2 corresponds to a flight plan approved by a pilot of the aircraft (and entered via the man/machine interface 16).

If the flight management system 2 concludes that the above two conditions are fulfilled simultaneously, it authorizes the guidance by the guidance system 4 of the aircraft AC along this flight trajectory T2.

Consequently, after verification of the trajectory T2 transmitted, the guidance system 4 informs the flight management system 2 of the validity status of the new stored trajectory (passive trajectory). The flight management system 2 authorizes the guidance of an LLF trajectory if and only if this trajectory has been validated by the guidance system 4 and it is well defined in the flight plan (known by the pilot).

For the implementation of this authorization, the flight management system 2 provides the guidance system 4 with the identification number or code for the trajectory T2 to be followed (for example "TRAJ2" or "T2").

Figure 4:
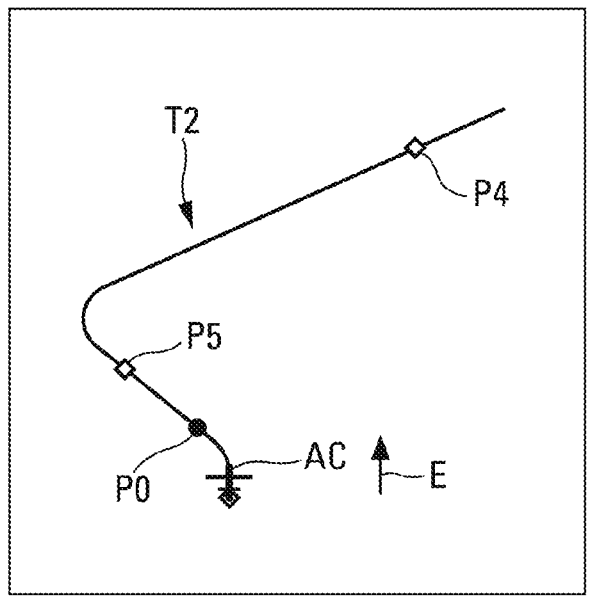

The guidance system 4 then automatically activates the trajectory T2 of LLF type (thus allowing guidance following this trajectory T2), as is represented in FIG. 4 for the aforementioned example. This activation therefore takes place if and only if the flight management system 2 authorizes it, by providing the identification number (or code) of the trajectory to be followed.

Furthermore, the guidance assembly 1 comprises, moreover, erasure units 23 and 24 arranged for example, respectively, in the computation units 3 and 8. These erasure units 23 and 24 are configured so as, during the activation of a new flight trajectory T2, to erase the previously active flight trajectory T1 in the memories 19 and 20, as well as the previous flight plan (relating to the trajectory T1) in the memory 19.

Consequently, upon a revision during the LLF flight, the current flight plan and the corresponding current trajectory T1 are stored by the current flight management system 2. The guidance assembly 1 then enters a standby state (or "LLF Pending State"). Upon activation of the new trajectory T2, the current flight plan and the current trajectory T1 are erased from the erasure unit 23.

Figure 5:
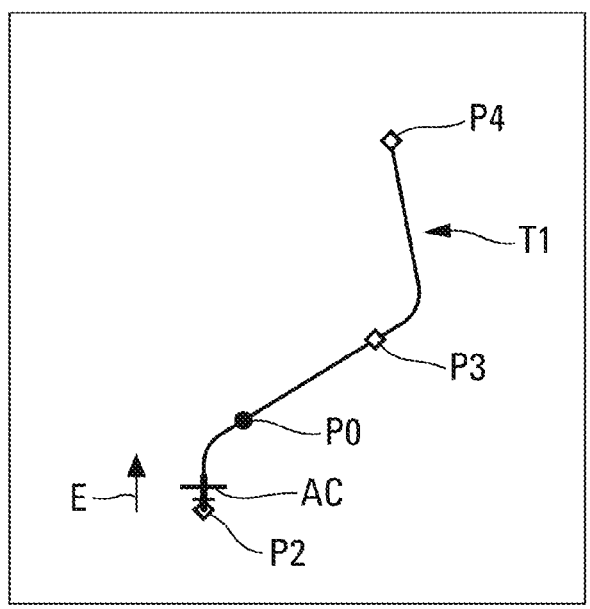
FIG. 5 illustrates a situation of failure of the activation of a new low-altitude flight trajectory.

Furthermore, the flight management system 2 is configured so as, in case of failure of the activation of the new flight trajectory T2, to reactivate the current flight plan and the current flight trajectory T1 (an operation termed "roll back"), as represented for the example considered in FIG. 5 (to be studied in parallel with FIG. 4 for which the revision has succeeded).

A failure of activation can arise in numerous cases, for example when the trajectory revision process takes too long a time to make it possible to carry out the change of trajectory at the point of separation of the two trajectories.

Figure 6:
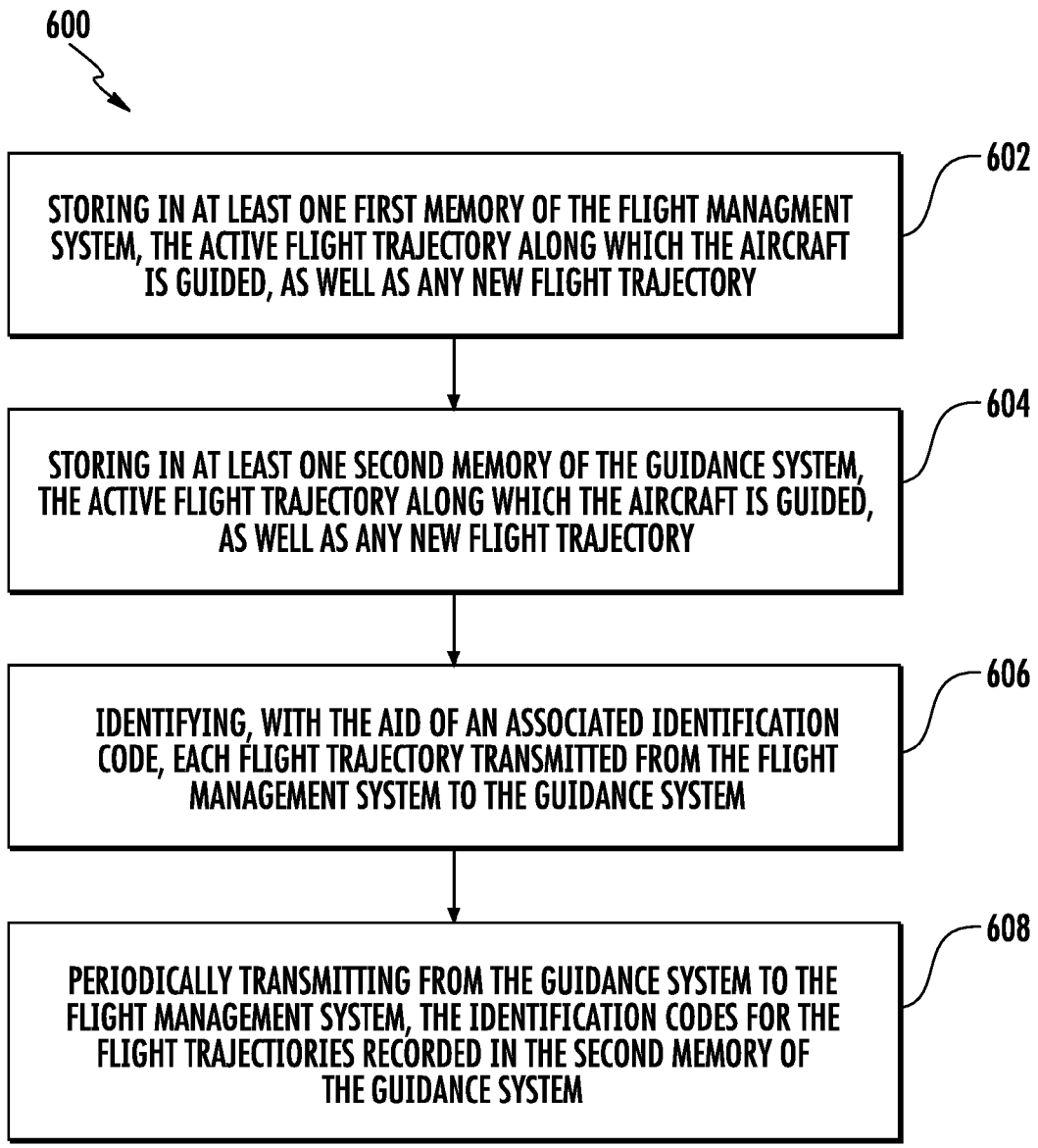
FIG. 6 is a flow chart of a method of guidance of an aircraft during a low-altitude flight.

FIG. 6 is a flow chart of a method 600 of guidance of an aircraft during a low-altitude flight. The method comprises:
a) constructing with the aid of a flight management system a low-altitude flight trajectory corresponding to a flight plan, the flight trajectory being transmitted from the flight management system to a guidance system, the flight management system being able to construct at least one new low-altitude flight trajectory corresponding to a new flight plan; and
b) guiding the aircraft with the aid of the guidance system, along the low-altitude flight trajectory termed the active flight trajectory,
and the method 600 comprises the additional steps of:
storing in at least one first memory of the flight management system, the active flight trajectory along which the aircraft is guided, as well as any new flight trajectory (602);
storing in at least one second memory of the guidance system, the active flight trajectory along which the aircraft is guided, as well as any new flight trajectory (604);
identifying, with the aid of an associated identification code, each flight trajectory transmitted from the flight management system to the guidance system (606); and
periodically transmitting from the guidance system to the flight management system, the identification codes for the flight trajectories recorded in the second memory of the guidance system (608).

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of guidance of an aircraft during a low-altitude flight, the method comprising:
   a) constructing with the aid of a flight management system a low-altitude flight trajectory corresponding to a flight plan, the flight trajectory being transmitted from the flight management system to a guidance system, the flight management system being able to construct at least one new low-altitude flight trajectory corresponding to a new flight plan; and
   b) guiding the aircraft with the aid of the guidance system, along the low-altitude flight trajectory termed the active flight trajectory,
   which comprises additional steps of:
   storing in at least one first memory of the flight management system, the active flight trajectory along which the aircraft is guided, as well as any new flight trajectory;
   storing in at least one second memory of the guidance system, the active flight trajectory along which the aircraft is guided, as well as any new flight trajectory;
   identifying, with the aid of an associated identification code, each flight trajectory transmitted from the flight management system to the guidance system; and
   periodically transmitting from the guidance system to the flight management system, the identification codes for the flight trajectories recorded in the second memory of the guidance system.

2. The method of claim 1, comprising exchanging of activation information between the flight management system and the guidance system, the activation information indicating at least the active flight trajectory along which the aircraft (AC) is guided.

3. The method of claim 1, comprising, for any new flight trajectory:
   implementing in the guidance system, a verification comprising verifying whether or not the new flight trajectory is valid; and
   transmitting from the guidance system to the flight management system a validity status relating to the new flight trajectory, this validity status indicating whether or not the new flight trajectory is valid.

4. The method of claim 1, comprising:
  implementing in the flight management system, a verification comprising verifying whether the following two conditions are fulfilled for a new flight trajectory:
    this new flight trajectory is considered to be valid by the guidance system; and
    this new flight trajectory corresponds to a flight plan approved by a pilot of the aircraft; and
  for the flight management system, authorizing the guidance by the guidance system of the aircraft along this new flight trajectory, if these two conditions are fulfilled simultaneously.

5. The method of claim 1, comprising, upon an activation of a new flight trajectory, erasing the previously active flight trajectory, in the first and second memories.

6. The method of claim 1, comprising, in case of failure of an activation of a new flight trajectory, reactivating at the level of the flight management system a previous flight plan and an associated flight trajectory.

7. An assembly for guidance of an aircraft during a low-altitude flight, the guidance assembly comprising:
  a flight management system configured to construct a low-altitude flight trajectory corresponding to a flight plan, the flight management system being configured to construct at least one new low-altitude flight trajectory corresponding to a new flight plan;
  a data transmission unit configured to transmit the flight trajectory from the flight management system to a guidance system; and
  the guidance system which is configured to guide the aircraft (AC) along the low-altitude flight trajectory, termed the active flight trajectory,
  wherein:
    the guidance assembly comprising:
      at least one first memory forming part of the flight management system, the first memory being configured to store the active flight trajectory along which the aircraft is guided and any new flight trajectory; and
      at least one second memory forming part of the guidance system, the second memory being configured to store the active flight trajectory along which the aircraft is guided and any new flight trajectory, received from the flight management system; and
    the guidance assembly is configured to periodically transmit from the guidance system to the flight management system identification codes for the flight trajectories recorded in the second memory of the guidance system, each flight trajectory transmitted from the flight management system to the guidance system being identified with the aid of an associated identification code.

8. The assembly of claim 7, configured to implement an operation comprising, during activation of a new flight trajectory, erasing the previously active flight trajectory, in the first and second memories.

9. The assembly of claim 7, wherein the flight management system is configured to implement an operation comprising, in case of failure of an activation of a new flight trajectory, reactivating the current flight plan and the associated flight trajectory.

10. An aircraft, comprising a guidance assembly of claim 7.

* * * * *